Dec. 31, 1957   O. W. BARKER ET AL   2,818,002
TRANSFER MACHINES

Original Filed Jan. 31, 1952   4 Sheets-Sheet 1

INVENTORS
Orrin W. Barker,
Joseph J. Lenert.
BY
Attorney

Dec. 31, 1957    O. W. BARKER ET AL    2,818,002
TRANSFER MACHINES
Original Filed Jan. 31, 1952      4 Sheets-Sheet 3

INVENTORS.
Orrin W. Barker,
Joseph J. Lenert.
BY
Elroy J. Wutschel
Attorney

Fig. 5

INVENTORS.
Orrin W. Barker,
Joseph J. Lenert.
BY
Elroy J. Wintockel
Attorneys

United States Patent Office 2,818,002
Patented Dec. 31, 1957

2,818,002

TRANSFER MACHINES

Orrin W. Barker, New Berlin, and Joseph J. Lenert, Milwaukee, Wis., assignors to Kearney & Trecker Corporation, West Allis, Wis., a corporation of Wisconsin Original application January 31, 1952, Serial No. 269,191, now Patent No. 2,749,811, dated June 12, 1956. Divided and this application January 10, 1956, Serial No. 558,384

14 Claims. (Cl. 90—59)

This invention relates generally to machine tools, and has more particular reference to an improved clamping mechanism especially adapted for use on transfer type machine tools. This patent application constitutes a division of our copending patent application, Serial No. 269,191, filed January 31, 1952 entitled Transfer Machines, which has issued as U. S. Patent No. 2,749,811, dated June 12, 1956.

A general object of the present invention is to provide an improved clamping mechanism adapted to receive and hold a workpiece in a predetermined exact position.

Another object of this invention is to provide an improved clamping mechanism for securing workpieces after they have been positioned, without displacing them from their position.

Another object of this invention is to provide an improved clamping mechanism operative to effect a clamping action on a workpiece from four sides.

Another object of the present invention is to provide an improved clamping mechanism wherein the end clamping elements that operate in the path of travel of the workpiece, are automatically moved to an inoperative position after releasing the workpiece so as not to interfere with the movement of the workpiece to its succeeding station.

Still another object of this invention is to provide an improved clamping mechanism capable of receiving a workpiece, positioning the workpiece in an exact desired position, and clamping the workpiece in such position.

A further object of the present invention is to provide an improved clamping mechanism adapted to function in timed relationship with other operative members of a transfer type machine tool.

According to this invention there is provided an improved clamping mechanism wherein clamping of a workpiece is effected by clamping elements acting on four sides of the workpiece. The clamping elements on one of the sides are stationary and function as positive locating elements for the workpiece as well as stops for cooperating with the movable clamping elements to secure the workpiece in position. The clamping elements on the opposite side are movable, and when actuated, exert a lateral force on the workpiece to positively insure that the workpiece is located against the stationary side clamping elements and to securely clamp the workpiece in the desired position. The ends of the workpiece are securely held by clamping elements that are secured to rotatable members which, when actuated, pivot the clamping members into operating position at either end of the workpiece. One of the end clamping members is positively located in relation to the longitudinal axis of the workpiece, while the opposite end member is movable longitudinally towards the locating member to effect the clamping action. Thus, the workpiece is positively located longitudinally and effectively clamped in this position. In releasing the clamping mechanism, the movable side members are pivoted outwardly to release the lateral clamping force while the movable end clamping member is moved longitudinally away from the workpiece thereby releasing the end clamping forces. The two end clamping elements are then pivoted to an out of the way position to clear the path of travel of the workpiece.

The foregoing and other objects of this invention will become more fully apparent from the following detailed description, and may be achieved by the exemplifying apparatus depicted in and further described in detail in connection with the accompanying drawings, in which.

Figure 1:
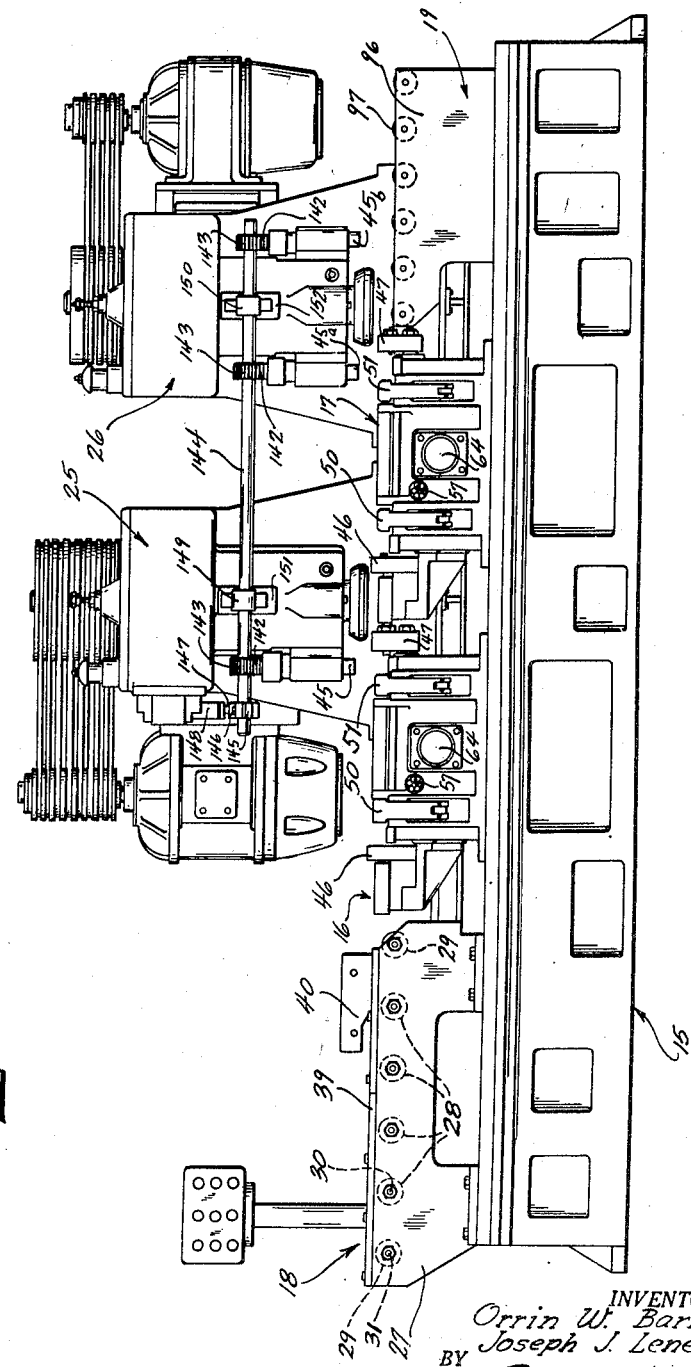
Figure 1 is a view in front elevation of a transfer type milling machine in which the present invention is incorporated.

Referring more specifically to the drawings and particularly to Fig. 1 thereof, the invention is shown embodied in a milling machine comprising, in general, a main frame or bed 15 rigidly supporting a pair of clamping units 16 and 17 located in juxtaposition on the central portion of the bed in predetermined position. The clamping units 16 and 17 are disposed between two conveyors 18 and 19 mounted on either end of the bed 15, for carrying workpieces to and from the clamping units. The conveyor 18 serves to receive the workpieces to be operated upon and move them into position to be transferred to the clamping unit 16 where the first machining operation is performed. The completed workpieces are transferred (in a manner to be described) from the clamping unit 16 to the clamping unit 17 and thence to the conveyor 19 which functions to discharge them from the machine.

Adjacent to the main bed 15 and permanently secured thereto in parallel relationship is a secondary bed (not shown) upon which is slidably supported a saddle (not shown) to which is secured a pair of spindle head units 25 and 26 that are utilized for moving the workpieces and effecting the cutting operation. The saddle is movable longitudinally in its path of travel by any well known means, such as a piston and cylinder mechanism.

The conveyor unit 18 includes a conveyor frame 27 to which rollers 28 and short rollers 29 are mounted by means of roller shafts 30 and short roller shaft 31, respectively, and spaced apart so that the workpiece can be moved along the conveyor 18 with each roller successively taking up the load.

At the inner end of the conveyor 18 is a spring actuated stop mechanism (not shown) which stops the forward movement of the workpiece to control the workpieces admitted into the machine. Lateral movement of the workpieces is limited by longitudinal guide bars 39, one of which is shown, disposed on either side of the rollers 28 and 29.

Upon being stopped by the spring actuated stop mechanism, the workpiece remains in this position until the stop is depressed by a cam 40, mounted on the movable saddle, and urging it downwardly when the saddle reaches the end of the cutting stroke, thus clearing the path for movement of the workpiece to its next succeeding station.

Upon being stopped by the stop mechanism, the workpiece is maintained in a properly aligned position by the longitudinal guide bars 39 and the stop, for receiving a transfer pin 45, carried by the spindle head unit 25, the transfer pin being movable axially to enter a suitable opening (not shown) formed in the workpiece. Thus, the transfer pin 45 serves to link the workpiece to the spindle head unit 25, and as the latter moves in its return stroke, after completing a cutting operation, it pulls the workpiece with it to its next station.

In this manner the workpiece is transferred from the conveyor 18 to the clamping unit 16 and then on its next movement into the similar clamping unit 17, both being secured to the bed 15 by any well known means, such as bolts or welding. These clamping units serve to accurately position the workpiece in a predetermined desired position and to hold the workpieces in place during the machining process. For a more detailed description of the machine tool illustrated in connection with the present invention reference may be made to the previously mentioned U. S. Patent No. 2,749,811. Inasmuch as both clamping units 16 and 17 are identical, the construction and operation of only one will be described.

Figure 2:
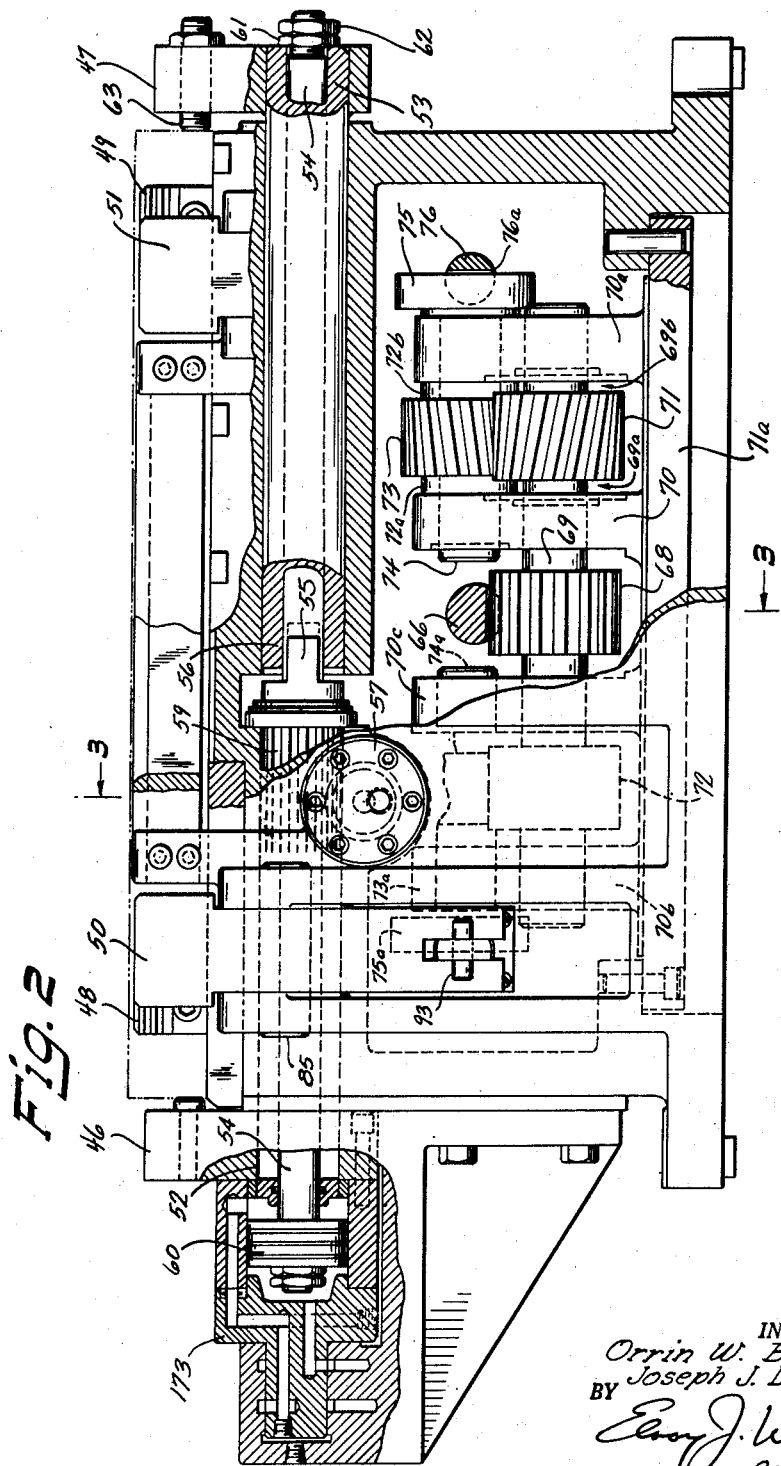
Fig. 2 is an enlarged detail view in front elevation of a clamping unit with portions broken away to reveal the internal structure.
Figures 3, 4:
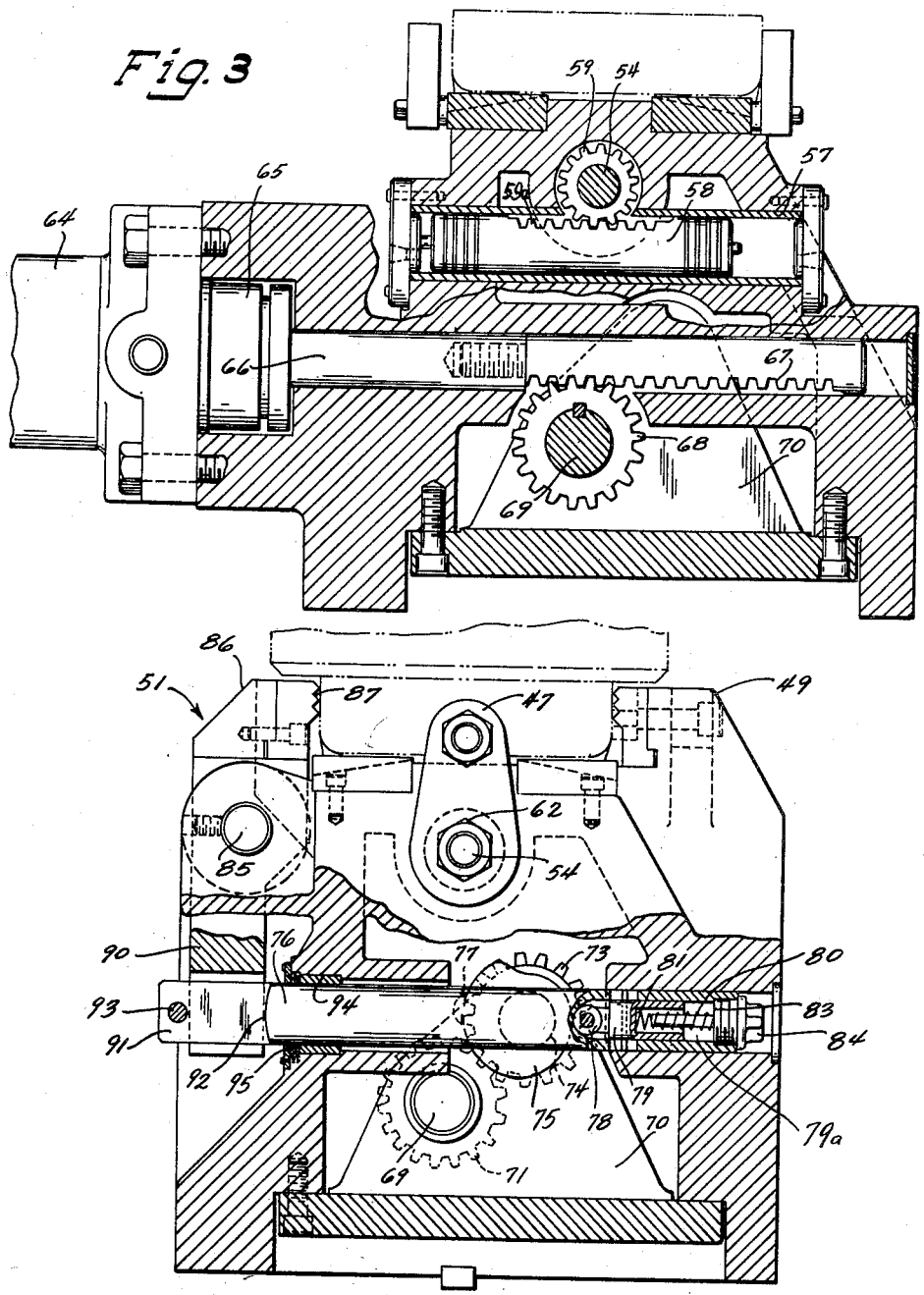
Fig. 3 is a view in vertical section taken along the plane represented by the line 3—3 in Fig. 2.
Fig. 4 is an end view of the clamping mechanism of Fig. 2 with parts broken away to show the internal actuating mechanism for one of the movable side clamps; and, Fig. 5 is a diagrammatic view illustrating the hydraulic circuit of the illustrated transfer type machine tool in which the present invention has been incorporated.

Referring to Figs. 2, 3 and 4, it can be seen that the workpiece is held in place by end clamps 46 and 47, and side clamps 48, 49, 50 and 51, and of these clamps 46, 47, 50 and 51 are movable for the purpose of applying the clamping force to the workpiece, while the side clamps 48 and 49 are stationary. Clamps 46 and 47 are pivotable laterally to a position below the base of the workpiece to permit passage of the workpiece.

As previously stated, the clamping unit 16 is secured to the bed 15 in a predetermined desired position, so that the gripping faces of the stationary clamps 48 and 49 are disposed to align the workpiece so that the portion of the workpiece to be operated on is in longitudinal alignment with the center line of the path of travel of the cutting elements carried by the spindle head units 25 and 26. Upon completion of a cutting operation the transfer pin 45 of the spindle head unit 25 engages the workpiece to couple the workpiece to the spindle unit 25 and the latter is then actuated in its return stroke, drawing the workpiece with it from the conveyor 18 to the clamping unit 16. However, in being moved there is a possibility that the workpiece will be shifted out of the desired position. Therefore, when the workpiece is moved into the clamping unit 16, and the clamping unit actuated, the movable clamps 50 and 51 will contact the workpiece to move it in position against the faces of the stationary clamps 48 and 49. Thus, positive lateral positioning of the workpiece in a predetermined desired position is assured.

Clamp 46 is welded onto a sleeve 52 and clamp 47 is welded to a sleeve 53, whereby all pivotal movements of these clamps are controlled by the sleeves both of which are slidably and rotatably mounted on a piston rod 54, and are interconnected for simultaneous rotational movement through cooperating clutch teeth 55 and 56. This type of connection allows limited longitudinal movement of the sleeves while remaining in contact with each other thereby permitting one sleeve to rotate the other sleeve about the piston rod 54.

In Fig. 3, there is shown a hydraulic acuating mechanism for rotating the sleeves 52 and 53 to pivot the end clamps 46 and 47 clear of the path of the workpiece. A hydraulic cylinder 57, with a double acting piston 58 within, is the original source of the rotational force to the sleeves 52 and 53. The sleeve 52 is provided with a gear portion 59 at one end disposed to mesh with a gear rack 59a formed on the piston 58, so that any movement of the piston 58 within the hydraulic cylinder 57 will rotate the sleeve 52 which, in turn, rotates the sleeve 53, thereby effecting pivotal movement of the clamps 46 and 47 into or out of position.

As clearly shown in Fig. 2, the longitudinal positioning and clamping of the workpiece is accomplished by means of the piston rod 54. One end of the piston rod 54 is secured to a piston 60, and the opposite end is secured to the clamp 47 by nut 61 and lock-nut 62. Thus, whenever the piston 60 is moved by hydraulic pressure to the right, as viewed in Fig. 2, a longitudinal movement of the end clamp 47 away from the end clamp 46 will occur, releasing the clamping pressure exerted on the workpiece by clamp 47 through an adjustable stud 63. With the end clamping pressure released, the end clamps 46 and 47 may be pivoted out of the path of the workpiece by rotating the sleeves 52 and 53 as previously described.

When a new workpiece has been placed in the clamping unit 16 by the returning spindle head unit 25, the sleeves 52 and 53 are again rotated to pivot the end clamps 46 and 47 to their upright position, as shown in Fig. 2. At this time the piston 60 is moved by hydraulic pressure to the left to effect longitudinal movement of the end clamp 47 towards the end clamp 46. The end clamp 47 will move the workpiece with it until the workpiece is in contact with the end clamp 46 to position the workpiece in a predetermined desired longitudinal position. Continued hydraulic pressure on the piston 60 will effectively clamp the workpiece between the end clamps 46 and 47.

Slide clamping pressure is exerted by the use of the four side clamps 48, 49, 50 and 51. Of these, clamps 48 and 49 are stationary and serve to fix the position of the workpiece laterally, as previously mentioned. End clamps 50 and 51 are movable to urge the workpiece against the stationary clamps, to position the workpiece in a predetermined desired lateral position and to exert a gripping pressure upon it.

The side clamps 50 and 51 are actuated by a piston 65 movable within a cylinder 64 into which hydraulic fluid under pressure may be selectively admitted to either side of the piston to effect pivotal movement of the clamps 50 and 51 into or out of clamping engagement. The piston 65 within the cylinder 64 is connected to a piston rod 66 having a gear rack 67 formed thereon for coaction with a spur gear 68, as best shown in Figs. 2 and 3. The spur gear 68 is keyed to a shaft 69 journalled in upright brackets 70, 70a, 70b and 70c integrally formed with the base plate 71a of the clamping unit frame. The shaft 69 also carries spiral gears 71 and 72 which are secured to the shaft for rotation with it. The spiral gears 71 and 72 are utilized to transmit power to separate gear systems, each gear system being operably connected to pivot its associated side clamp into or out of clamping engagement.

As can be seen in Fig. 2, the shaft 69 is so disposed in the brackets 70, 70a, 70b and 70c as to have limited axial movement in both directions as defined by the width of the spaces 69a and 69b which exist between the bracket 70 and the gear 71 and the bracket 70a and the gear 71, respectively. Inasmuch as the gear systems contiguous to the spiral gears 71 and 72 are the same, only that system associated with the spiral gear 71 and side clamp 51 will be described in detail.

As shown in Figs. 2 and 4, the spiral gear 71 is in meshing engagement with a spiral gear 73 keyed to a shaft 74 for rotating a cam 75 secured to the end of the shaft. Mounted on the shaft 74 on either side of the gear 73 are a pair of spacers 72a and 72b which effectively prevent axial movement of the gear 73 and the shaft 74. The cam 75 is disposed to fit within a slot 76a formed in a rod 76 and is adapted to be in constant contact with an arcuate surface 77 defining one end of the slot. To this end, a roller 78 mounted on a plunger 79 is carried within a hollow portion 79a formed in the rod 76 and which extends from one end thereof and communicates with a surface defining the opposite end of the slot 76a. A spring 80, one end of which is engaged within a cavity 81 formed in the plunger 79, is compressed between the base of the cavity and a face 83 of a tension adjusting nut 84 threaded in the end of the rod 76. The spring 80 urges the roller 78 against the peripheral surface of the cam 75, and with the cam as a base, urges the rod 76 to the right, as viewed in Fig. 4, so that the surface 77 on the rod 76 is also kept in constant contact with the peripheral surface of the cam 75. Therefore, any change in the distance between the peripheral surface of the cam in contact with the surface 77 of the rod 76 and the axis of the cam will be reflected in a varying linear movement of the rod 76.

As previously stated, the shaft 69 with the gears 68, 71 and 72 is so constructed and arranged as to be movable axially in either direction. Therefore, if either of the clamps 50 or 51 contact the workpiece ahead of the other the movement of its driving cam 75 will stop as well as the associated spiral gear 73. The shaft 69 with the gears 68, 71 and 72 will drift towards the other clamp until that clamp also contacts the workpiece whereupon both clamps will exert a simultaneous clamping pressure on the workpiece.

Assuming that the clamp 51 contacts the workpiece first, its actuating cam 75 along with the cam driving spiral gear 73 and shaft 74 will stop rotating. However, the spiral gear 71 will continue to be rotated and since the shaft 69 is freely movable axially, the rotative force of the spiral gear 71 will move the gear 71 and shaft 69 to the left, as viewed in Fig. 2. This leftwardly movement of the shaft 69, of course, moves the spiral gear 72, also to the left. However, since the clamp 50 has not contacted the workpiece, its driving cam 75a with its driving spiral gear 73a and shaft 74a continues to be rotated. When the clamp 50 contacts the workpiece the resisting forces acting against the spiral gears 71 and 72 are equalized and the spiral gear 71 can no longer expend its force in moving itself and the shaft 69 leftwardly. Since the power input through the gear 68 will be continuing, the spiral gears 71 and 72 will engage their associated clamps 50 and 51 with the workpiece with an equalized pressure, moving the workpiece against the stationary clamps 48 and 49 and clamping it in the desired position.

Movement of the rod 76 is reflected in the side clamp 51, which is pivoted about a pin 85, along with its components, a jaw 86 and its serrated insert 87. Fixed to the lower end of the clamp 51 is a fork 90 which fits over a tongued end 91 of the rod 76. The inner surfaces abut convex surfaces 92, one of which can be seen in Fig. 4, provided on the end of the rod 76 at each side of the tongue 91 at its base. The tongue end 91 of the rod 76 is kept within the fork 90 by a pin 93. In this manner any movement of the rod 76, slidably mounted in a suitable bushing 94 and protruding out of a cover plate 95, will be transmitted to the clamp 51.

A duplicate clamping unit 17 of identical construction as the clamping unit 16, described in detail above, is attached to the bed 15 adjacent to the clamping unit 16. Inasmuch as the parts and operation of the two units are identical a detailed description of clamping unit 17 is omitted.

Adjacent the clamping unit 17, is the conveyor unit 19 for removing the workpiece from the milling machine and is comprised generally of a conveyor frame 96 on which a plurality of rollers 97 are rotatably supported. A workpiece in the clamping unit 17 is removed therefrom by action of a transfer pin 45b carried by the spindle head unit 26, being engaged in the workpiece in the clamping unit 17. At the same time a transfer pin 45a also carried by the spindle head unit 26, engages with the workpiece in the clamping unit 16 and the transfer pin 45 carried by the spindle head unit 25 engages with a workpiece released from the conveyor 18. With the several transfer pins thus engaged, the return stroke of the spindle head units 25 and 26 to the position shown in Fig. 1, will advance a new workpiece from the conveyor 18 into the clamping unit 16, the workpiece in clamping unit 16 will be advanced to the clamping unit 17, and the workpiece in clamping unit 17 will be moved to the conveyor 19.

The transfer pins are all moved simultaneously through the operation of a gear rack 142 formed on each pin in position to mesh with cooperating spur gears 143 keyed to a rod 144 to rotate with it. The rod is revolved by a spur gear 145 which is rotated by an actuating gear rack 146 provided on the end of a piston rod 147 secured to a piston (not shown) in a cylinder 148 attached to the spindle head unit 25. The rod 144 is supported on the spindle head units 25 and 26 by bearings 149 and 150 mounted on plates 151 and 152 secured to the spindle head unit in a conventional manner.

All clamping of the clamping units and movements of the saddle and the transfer pins are the result of hydraulic pressure being applied to various hydraulic cylinders which actuate the movements. The oil pressure in the hydraulic circuit is maintained by two double pumps 153 and 154 driven by an electric motor 155 as best shown in the diagrammatic view of Fig. 5.

The hydraulic fluid is drawn from an oil reservoir 156 through an oil filter 157 and intake pipes 158 into the double pump 153 where the fluid is pumped into the circuit under pressure. The fluid leaves the double pumps 153 through oil lines 159 and 160. The line 159 communicates with a line 161 which is connected to a solenoid valve 165. Meanwhile the fluid in the line 160 is partially channeled into a pilot line 180 which is in communication with the line 160, the function of which will be subsequently described. The fluid remaining in the line 160 passes through a check valve 162 into a line 161 and thence into a branch line 185. The balance of the fluid in the line 161 combines with the fluid flowing from the line 159 with the excess fluid returning to the reservoir via a relief valve 163 and line 199.

A solenoid 164 of the solenoid valve 165 is energized manually, through an electric switch (not shown) for the purpose of positioning the valve to permit the fluid in the line 161 to pass through the valve into a line 167. From the line 167 the fluid flows into lines 168 and 169 which are in communication with the line 167 and with the hydraulic cylinders 57 of the double acting pistons 58. The fluid pressure in the cylinders 57 causes the pistons to move thereby effecting rotation of the sleeves 52 and 53 to pivot the end clamps 46 and 47 into an upright position as previously described.

After the end clamps 46 and 47 are pivoted to the upright position, the pressure in the line 167 increases until it reaches a predetermined value sufficient to actuate a sequence valve 170 which is connected to the line 167. The fluid will then pass through the valve 170 to the rod ends of the pistons 60 in cylinders 173 via lines 171 and 172. The fluid pressure moves the pistons 60 inwardly causing the end clamps 47 secured to the rods 54 to move towards the end clamp 46 to clamp the workpiece in the clamping units 16 and 17 in endwise position.

Some fluid from the line 171 passes into a branch line 174 to actuate a sequence valve 175, letting the fluid from the line 167 pass through to a line 176 leading into the transfer pin cylinder 148 to effect rotation of the rod 144 which moves the transfer pins 45, 45a and 45b, simultaneously out of engagement with the workpieces.

As the transfer pins are being moved out of the workpieces, a limit switch 177 is tripped by a cam on the piston rod 147 energizing a solenoid 179 of a solenoid valve 178 to position an internal valve (not shown), to allow fluid pressure in the pilot line 180 to move a main valve (not shown) within the solenoid valve into a position where fluid from one of the pumps of the double pump 154 may flow to the line 184 via line 181, check valve 182 and a line 183. At this time fluid pressure in the line 161 has built up to a predetermined value to open a sequence valve 186 whereupon fluid from the line 161 flows through the line 185 and sequence valve 186 to combine with the fluid flowing in line 183. The combined fluid now flows through the solenoid valve 178 into line 184 and thence to the side clamp hydraulic cylinders 64 to pivot the side clamps 50 and 51 into clamping engagement with the workpieces.

When the pressure in the line 184 reaches a predetermined value, a pressure switch 187 operatively connected to be actuated by pressure from the line 184 is closed to energize a solenoid 188 of a solenoid valve 189. The solenoid 188 will move a pilot valve (not shown) within the solenoid valve 189 into position so that fluid in another branch of line 180 can position the internal main valve (not shown) of the solenoid valve 189 to permit fluid from one of the pumps of the double pump 154 to flow through a feed line 190 through the solenoid valve 189 into a line 191. The feed line 190 is also connected to another relief valve 163, similar to the relief valve 163 associated with the pump 153, to allow fluid to return to the reservoir through a return line 199.

The hydraulic circuit for operating the clamping units of the present invention is associated with the hydraulic circuit for controlling the movement of the movable members of the machine tool in the present embodiment, and the complete circuit is therefore described to clarify the operation of the clamping units. It is, however, to be understood that the clamping units of the present invention may operate in conjunction with the hydraulic circuits of other machine tools or may be operated by an independent hydraulic circuit without in any way detracting from its efficiency.

The oil in the line 191 is utilized to actuate the saddle in its path of movement and to this end flows to a piston and cylinder mechanism 109 operably connected to the saddle to effect the feeding movement of the saddle. The exhaust fluid from the mechanism 109 is returned to the reservoir through lines 197, a metering control valve 198, the solenoid valve 189, the relief valve 163 and the return line 199 connected to the solenoid valve 189. For a more detailed description of the functioning of the piston and cylinder mechanism 109 with its associated valves and switches, references may be made to our previously mentioned U. S. Patent 2,749,811.

When the saddle is moved to its limit of travel a cam 200 fixed to a piston rod 110 trips a limit switch 201 which closes an electric circuit so that the solenoid valve 189 is deenergized and a solenoid 202 of the solenoid valve 165 is energized, causing fluid to flow from the line 161 into a line 203 to the transfer pin hydraulic cylinder 148 to lower pins 45, 45a and 45b into engagement with the workpieces for transferring them to the next stations. When the pins are in place, the fluid pressure in the line 203 builds up until the fluid is passed through a sequence valve 204 into an oil line 205 to be conducted to the end clamp hydraulic cylinders 173 where the pressure is exerted on the head end side of the pistons 60 to move the piston rods 54 outwardly releasing the end clamping pressure. Oil line 205 is also connected to the hydraulic cylinders 57 to actuate the pistons 58 for pivoting the end clamps 46 and 47 to clear the path of movement of the workpieces.

Meanwhile, a pressure switch 206 connected into the line 203 is actuated when the pressure in the line reaches a predetermined value. The switch 206 upon being actuated closes an electric circuit which energizes a solenoid 207 of the solenoid valve 178 to actuate its internal pilot valve, so that fluid in the line 183 flows through the valve into a line 208 to the side clamp hydraulic cylinders 64 for the purpose of shifting their pistons 65 and piston rods 66 to effect a release of the side clamping pressure.

The movement of the pistons 65 and their associated piston rods 66, as well as the movement of the pistons 58 to release the side clamping pressure and effect the pivotal movement of the end clamps 46 and 47 to provide clearance for the workpiece, results in the closing of a pair of limit switches 209 and 210, by a cam 211 on the rods 66 of the side clamping cylinders 64, and also the closing of a pair of limit switches 212 and 213 by a cam 214 on the double acting pistons 58. Upon closing of these limit switches, a solenoid 215 of the solenoid valve 189 is energized, to effect opening of the solenoid valve to a line 216 connected to the cylinder 109 to retract the saddle to its initial starting position. The movement of the saddle to its starting position is accomplished at a rapid traverse rate by means of increasing the volume of fluid to the cylinder mechanism 109 through the operation of a sequence and check valve 217. The valve 217 is actuated by pressure from the line 183, which is connected to the valve by a line 218. When the pressure in the line 218 reaches a predetermined value, it actuates the valve 217 permitting the fluid to flow through the valve into the line 216, through the check valve 219 and into the line 197 where it flows to the hydraulic saddle actuator 109. When the piston rod 110 of the hydraulic mechanism 109 nears the end of its return stroke a limit switch 220 is tripped by a cam 200 thereon to cause deenergization of the solenoid 215 of the solenoid valve 189 to complete the cycle.

A description of the electrical system is not included herein as it is not considered to be necessary for a clear understanding of the present invention. A detailed description of the electrical circuit appears in our aforementioned U. S. Patent No. 2,749,811 to which reference may be had if it is so desired.

From the foregoing explanation of the operation of the illustrated embodiment of the invention, it is apparent that there has been provided an improved clamping apparatus capable of accurately positioning and securing relatively large workpieces with substantially equal pressure being applied to the workpiece by the several clamping elements of the apparatus even though the dimensions of the workpieces may vary and that is adapted to grip the workpiece on all four sides but does not interfere with the movement of the workpieces from one station to another in a transfer machine tool.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a clamping mechanism adapted to secure a workpiece for operation upon by a cutter, a base having a surface upon which the workpiece to be secured rests, a sleeve rotatably mounted in said base, a second sleeve rotatably mounted in said base in axial alignment with said first sleeve and interconnected with said first sleeve for unitary rotation with it but movable axially with respect to it, an end clamp secured to said first sleeve at the end of said base in position to engage the end of the workpiece as it rests upon said surface of the base, a second end clamp fixed to said second sleeve at the other end of said base in position to engage the other end of the workpiece as it rests upon the surface of the base, both of said end clamps being mounted on said sleeves in position so that when the sleeves are rotated the end clamps move with them to enable them to be pivoted to a position below said surface of the base to clear a path for the workpiece for sliding it onto or off of the base, and a rod extending through both of said sleeves and secured to said second axially movable sleeve, said rod being movable axially for moving said second sleeve and its associated end clamp into engagement with the end of the workpiece for exerting a pressure upon it to clamp the workpiece between the two end clamps.

2. In a clamping mechanism adapted to secure a workpiece for operation upon by a cutter, a base having a surface upon which the workpiece to be secured rests, a sleeve rotatably mounted on said base, a second sleeve rotatably mounted in said base in axial alignment with said first sleeve and interconnected with said first sleeve for unitary rotation with it but movable axially with respect to it, an end clamp secured to said first sleeve at the end of said base in position to engage the end of the workpiece as it rests upon said surface of the base, a second end clamp fixed to said second sleeve at the other end of said base in position to engage the other end of the workpiece as it rests upon the surface of the base, both of said end clamps being mounted on said sleeves in position so that when the sleeves are rotated the end clamps move with them to enable them to be pivoted to a position below said surface of the base to clear a path for the workpiece for sliding it onto or off of the base, a rod extending through both of said sleeves and secured to said second axially movable sleeve, said rod being movable axially for moving said second sleeve and its associated end clamp into engagement with the end of the workpiece, and a piston and cylinder mechanism connected to said rod for actuating it in its axial movement to move said second end clamp into engagement with the workpiece for exerting a pressure upon it to clamp the workpiece between the two end clamps.

3. In a clamping mechanism adapted to secure a workpiece for operation upon by a cutter, a base upon which the workpiece to be secured rests, an end clamp mounted on each end of said base for pivotal movement so that they may be pivoted below the surface upon which the workpiece rests to permit the workpiece to be slid onto the base, one of said end clamps being also movable laterally to exert an end pressure upon the workpiece for clamping it between said end clamps, a pair of side clamps rigidly secured to one side of said base in position to engage the side of said workpiece, and a second pair of side clamps pivotally mounted on the other side of said base in position to engage the side of said workpiece so that they may be pivoted to exert a side pressure upon the workpiece to clamp it between the two pair of side clamps, whereby a clamping pressure is applied to the workpiece in two directions.

4. In a clamping mechanism adapted to secure a workpiece for operation upon by a cutter, a base having a surface upon which the workpiece to be secured rests, an end clamp mounted on each end of said base for pivotal movement enabling them to be pivoted so as not to extend above the surface upon which the workpiece rests to clear a path for the workpiece for sliding it onto or off of the base, one of said end clamps being also movable toward and away from the base to engage the workpiece and clamp it between said end clamps, and power means connected to move said end clamp toward the base for exerting a pressure upon the workpiece to clamp it in position, whereby the workpiece may be securely clamped by the end clamps which can be pivoted out of their operating position to clear a path for sliding it onto or off of the base.

5. In a clamping mechanism adapted to secure a workpiece for operation upon by a cutter, a base having a surface upon which the workpiece to be secured rests, a first sleeve rotatably supported within said base, a first end clamp secured to said sleeve for rotation therewith, a second sleeve rotatably supported within said base in axial alignment with said first sleeve, said second sleeve being adapted to move axially relative to said first sleeve, means operably connecting said first sleeve and said second sleeve together in a manner that rotational movement of one sleeve will effect rotation of said other sleeve, a second end clamp secured to said second sleeve for rotation therewith, a piston and cylinder mechanism mounted within said base and operably connected to rotate said sleeves to pivot said end clamps into endwise position relative to the workpiece, and a second piston and cylinder mechanism carried by said base and operably connected to move said second end clamp relative to said first end clamp, whereby the workpiece may be securely clamped between said end clamps.

6. In a clamping mechanism adapted to secure a workpiece for operation upon by a cutter, a base having a surface upon which the workpiece to be secured rests, a pair of side clamps rigidly secured to one side of said base in position to engage the workpiece thereon, a second pair of side clamps movably supported on the opposite side of said base in position to be engageable with said workpiece, a gear transmission carried within said base and operably connected to actuate said movable side clamps into and out of engagement with said workpiece, and a piston and cylinder mechanism operably connected to drive said gear transmission.

7. In a clamping mechanism adapted to secure a workpiece for operation upon by a cutter, a base having a surface upon which said workpiece to be secured rests, a pair of side clamps secured to one side of said base in position to engage the workpiece, a second pair of side clamps pivotally mounted on the opposite side of said base in position to engage the workpiece, a pair of gear transmissions carried within said base, a pair of cams each operably connected to be rotated by one of said gear transmissions, a pair of rods slidably supported on said base, each of said rods being operably connected to one of said pivotal side clamps, said rods being connected to be movable axially by said cams, means operably connected to urge said rods into engagement with their associated cams at all times, and a piston and cylinder mechanism in said base operably connected to drive said gear transmissions simultaneously.

8. In a clamping mechanism adapted to secure a workpiece for operation upon by a cutter, a base having a surface upon which said workpiece to be secured rests, a sleeve rotatably mounted in said base, a second sleeve rotatably mounted in said base in axial alignment with said first sleeve and operably connected to said first sleeve for rotation therewith, said second sleeve also being movable axially independently of said first sleeve, an end clamp secured to said first sleeve in position to engage the end of said workpiece as it rests on said base, a second end clamp secured to said second sleeve in position to engage the opposite end of said workpiece as it rests on said base, said end clamps being positioned on said sleeves in a manner to enable them to be moved below the surface of said base to clear a path for the workpiece for sliding it onto or off of the base, power means operably connected to rotate said first sleeve, an axially movable rod extending through both of said sleeves and having one end secured to said axially movable second sleeve, and power means connected to the other end of said rod to move said rod and thereby said second sleeve with its associated end clamp into engagement with the end of said workpiece for exerting a pressure upon it to clamp the workpiece between the two end clamps.

9. In a clamping mechanism adapted to secure a workpiece for operation upon by a cutter, a base having a surface upon which the workpiece to be secured rests, a pair of side clamps secured to the side of said base in position to engage the side of the workpiece as it rests upon the surface of said base, a pair of movable side clamps movably mounted on the other side of said base in position to be engageable with the opposite side of the workpiece to exert a side pressure upon the workpiece to clamp it between the two pairs of side clamps, a pair of gear transmissions within said base, a pair of cams, each of said cams being operably connected to be rotated by one of said gear transmissions, a pair of rods slidable carried within said base, said rods each being provided with a slot for receiving one of said cams, means to urge said rods into constant engagement with said cams, means operably connecting said rods with said movable clamps, and power means operably connected to drive said gear transmissions simultaneously.

10. In a clamping mechanism adapted to secure a workpiece for operation upon by a cutter, a base having a surface upon which the workpiece to be secured rests, a first sleeve rotatably supported within said base, a second sleeve supported within said base for rotation and axial movement and positioned in axial alignment with said first sleeve, means operably connecting said sleeve so that they rotate together but permit axial movement of said second sleeve relative to said first sleeve, clamping elements secured to said sleeves in position to be rotated from a position below the workpiece supporting surface of said base to a position adjacent to the ends of a workpiece supported on said base, power means operably connected to move one of said clamps towards said base in a manner to engage the workpiece between said clamps and to exert a clamping pressure thereon, and power means operably connected to rotate said sleeves when the clamping pressure is released.

11. In a clamping mechanism adapted to secure a workpiece for operation upon by a cutter; a base upon which the workpiece to be secured rests; end clamps mounted on each end of said base for pivotal movement so that they may be pivoted below the surface upon which the workpiece rests to permit the workpiece to be slid onto the base, one of said end clamps being also movable laterally to exert an end pressure upon the workpiece for clamping it between said end clamps; a pair of stationary side clamps rigidly secured to one side of each base in position to engage the side of said workpiece; a second pair of side clamps pivotally mounted on the other side of said base in position to be pivotally moved into engagement with the opposite side of said workpiece; equalizing means operably connected to actuate said movable side clamps into engagement with said workpiece in a manner that said side clamps will operate simultaneously to exert an equal clamping pressure on said workpiece; and power means operably connected to actuate said equalizing means.

12. In a clamping mechanism adapted to secure a workpiece for operation upon by a cutter; a base having a surface upon which said workpiece to be secured rests; a pair of stationary side clamps secured to one side of said base in position to engage the workpiece; a pair of movable side clamps pivotally mounted on the opposite side of said base in position to be engageable with the workpiece; a pair of actuating members in said base operably connected to said movable clamps to move them into engagement with said workpiece; cam means associated with each of said actuating members to effect movement of said actuating members; resilient means operably connected to maintain each of said actuating members in constant engagement with their associated cams; a pair of cam shafts rotatably supported in said base and restrained from axial movement, said cams being secured to said shafts for rotation therewith; a spiral gear keyed to each of said cam shafts; a power shaft supported in said base for rotational and axial movement; a pair of spiral gears keyed to said power shaft in position to mesh with the spiral gears on said cam shafts; and power means operably connected to rotate said power shaft in either direction; whereby when said power shaft is rotated in one direction said cams are rotated to move said actuating members to pivot said movable clamps into engagement with said workpiece, and as one or the other of said clamps engages the workpiece its associated cam shaft and the spiral gear keyed thereto stop rotating causing the cooperating spiral gear on said power shaft to move said power shaft towards said other movable clamp to effect a continued pivotal movement of the other movable clamp until it engages said workpiece whereupon the power will be transmitted through both of said cam shafts to said clamps to effect an equalized clamping pressure on said workpiece.

13. In a clamping mechanism adapted to secure a workpiece for operation upon by a cutter, a base upon which the workpiece to be secured rests, an end clamp mounted on each end of said base for pivotal movement so that they may be pivoted below the surface upon which the workpiece rests to permit the workpiece to be slid onto the base, one of said end clamps being also movable laterally to exert an end pressure upon the workpiece for clamping it between said end clamps, a pair of side clamps rigidly secured to one side of said base in position to engage the side of said workpiece, a second pair of side clamps pivotally mounted on the other side of said base in position to engage the side of said workpiece, and equalizing means operably connected to actuate said pivotal side clamps into simultaneous clamping engagement with said workpiece.

14. In a clamping mechanism for securing a workpiece; a base adapted to receive the workpiece; a pair of movable side clamps mounted on one side of said base in position to engage the workpiece; immovable means fixed to the opposite side of said base and adapted to be abutted by the workpiece to serve as a stop for locating the workpiece in a desired position and enable said movable side clamps to apply pressure for clamping the workpiece; a clamp shaft for each of said movable clamps rotatably supported in said base and restrained from axial movement, each of said clamp shafts being operably connected to actuate its associated movable clamp into or out of engagement with the workpiece; a spiral gear secured on each of said clamp shafts for rotation with it; a power shaft supported in said base for rotational and axial movement; a pair of spiral gears secured to said power shaft and in meshing engagement with said spiral gears on said clamp shafts; and power means operably connected to rotate said power shaft in either direction; whereby when said power shaft is rotated in one direction said clamp shafts are rotated to move their associated movable clamps into engagement with the workpiece to clamp the workpiece against said immovable means, and as one or the other of said clamps engages the workpiece its associated clamp shaft and the spiral gear thereon stop rotating causing its cooperating spiral gear on said power shaft to move said power shaft toward the other movable clamp to effect continued movement of the other movable clamp until it engages the workpiece whereupon the power of said power shaft will be transmitted through both of said clamp shafts to said clamps simultaneously to effect an equalized clamping pressure on said workpiece.

References Cited in the file of this patent

UNITED STATES PATENTS

| 419,885 | Richards | Jan. 21, 1890 |
| 2,426,095 | Hecker | Aug. 19, 1947 |